United States Statutory Invention Registration [19]

[11] Reg. Number: H203

Thomas et al. [43] Published: Feb. 3, 1987

[54] INTEGRAL ROCKET MOTOR-WARHEAD

[75] Inventors: William B. Thomas; Robert E. Betts, both of Huntsville, Ala.

[73] Assignee: The United States of America as represented by the Secretary of the Army, Washington, D.C.

[21] Appl. No.: 695,499

[22] Filed: Jan. 28, 1985

[51] Int. Cl.[4] ..... F42B 15/10; C06B 45/12

[52] U.S. Cl. ..... 102/374; 102/288; 102/473; 102/490

[58] Field of Search ..... 102/288, 289, 290, 291; 102/374, 379, 473, 476, 490, 493

[56] References Cited

U.S. PATENT DOCUMENTS

| | | | |
|---|---|---|---|
| 2,910,000 | 10/1959 | Brandt | 102/476 |
| 3,490,373 | 1/1970 | Fox | 102/488 |
| 3,572,249 | 3/1971 | Davis | 102/491 |
| 4,355,577 | 10/1982 | Ady et al. | 102/291 |
| 4,459,915 | 7/1984 | Lynch | 102/490 |
| 4,466,352 | 8/1984 | Dalet et al. | 102/288 |

OTHER PUBLICATIONS

Kirk-Othmer, *Encyclopedia of Chemical Technology,* Third Ed., vol. 9, John Wiley & Sons, New York (1980), pp. 564, 628, 629.

*Primary Examiner*—Deborah L. Kyle
*Assistant Examiner*—Ted L. Parr
*Attorney, Agent, or Firm*—John C. Garvin, Jr.; Freddie M. Bush

[57] ABSTRACT

A rocket motor is disclosed which employs a Class 1.1 detonatable composition which is both a propellant and explosive. One grain design is configured to give a high boost acceleration during the burning phase of a perforated portion of the grain. The internally burning grain subsequently changes to an end-burning grain which provides a sustaining thrust burning period. The rocket motor flies to target with the burning surface progressing towards the head end. The rocket burns to target, but the design always provides some remaining propellant which serves as the warhead explosive on impact with the target. Detonator means cause the remaining unburned propellant to denonate at target impact or prior to target impact. This rocket motor design does not provide for separation between the warhead and the motor case. Therefore, the complete rocket motor travels to the target area. The rocket motor case may be serrated to give a controlled shrapnel effect upon detonation at target area which allows all the motor case to act as controlled warhead shrapnel. The rocket motor propellant grain is shaped in one design at the front end with a detonator located within the propellant to ensure that the explosive force acts in the desired direction to produce a desired shrapnel effect after detonation.

3 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTEGRAL ROCKET MOTOR-WARHEAD

DEDICATORY CLAUSE

The invention described herein may be manufactured, used, and licensed by or for the Government for governmental purposes without the payment to us of any royalties thereon.

BACKGROUND OF THE INVENTION

Present State-of-the-Art of Rocket Ordnance incorporates a rocket motor which propels a missile containing a desired warhead with such designs isolating the warhead from the rocket motor. The warhead uses explosives such as RDX, PETN, and Octol, while the rocket motor uses double base propellants and composite propellants for the propelling charge.

Inherent with a warhead designed to be separated from the rocket motor in present State-of-the-Art missiles are additional cost, additional complexities, and additional processing and handling procedures. Also, additional components, such as bulkheads between the motor and the warhead, are required for a missile system employing a separable warhead.

For simplicity of design, reduction of costs, improved processing and handling procedures, and elimination of extra component parts, a unitary propellant composition which serves as the propulsion system in flight and which is detonated as a warhead explosive on impact with the target would be a welcomed addition to the rocket ordnance field.

Therefore an object of this invention is to provide a detonatable composition which is both a propellant and a warhead explosive in a single rocket motor case.

Another object of this invention is to provide a propellant grain configured to give a high boost acceleration, a sustaining thrust, and a remaining propellant portion which serves as an explosive warhead on impact.

A further object of this invention is to provide a single rocket motor case loaded with a combination propellant grain and explosive composition having a burning surface progressing towards the head end as the rocket flies to the target with some explosive propellant composition always remaining which serves as the warhead explosive on impact with the target.

SUMMARY OF THE INVENTION

A Class 1.1 detonatable composition which is both a propellant and explosive is contained in a rocket motor case. The propellant grain is configured to give a high boost acceleration, a sustaining thrust and a burning surface progressing towards the head end with some propellant grain always remaining which serves as the warhead explosive on impact with the target.

One embodiment provides for a serrated rocket motor case which results in case breakup upon detonation to give a controlled sharpnel effect. Another embodiment employs an explosive propellant grain having the effect of a shape charge at the front end. In this design, the explosive propellant grain is shaped to control the direction of the explosive force after detonation by detonator means located within the propellant charge to insure that the explosive acts in the right direction to produce the right shaping effect.

DESCRIPTION OF THE PREFERRED EMBODIMENT

Figure 1:
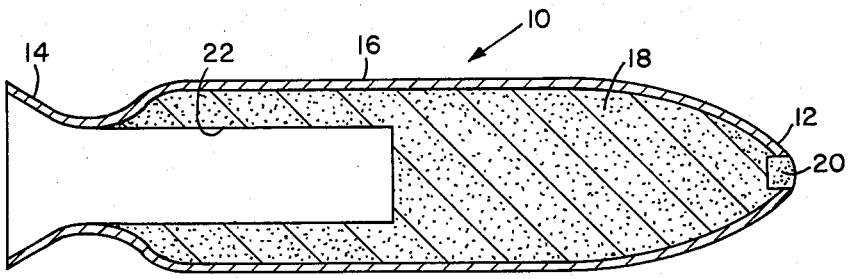
FIG. 1 is a rocket motor containing an explosive propellant grain having an exposed surface for burning after ignition to provide a boost thrust phase.

Referring now to FIG. 1, rocket 10 is illustrated that has a forward motor case section 12 and a rear nozzle section 14. Between the rear nozzle section 14 and forward motor case section 12, there is a continuous rocket motor case 16 which may be serrated for shrapnel effects. Contained within the rocket motor case 16 is a detonatable Class 1.1 composition 18 which is both a propellant and explosive. Positioned at the forward motor case section and in contact with the explosive 18 is a detonation fuze 20. The burning surface area is designated 22 during boost phase, and the designation is changed to 24 when the boost burning phase is completed and during the sustaining thrust phase as further explained below.

Figure 2:
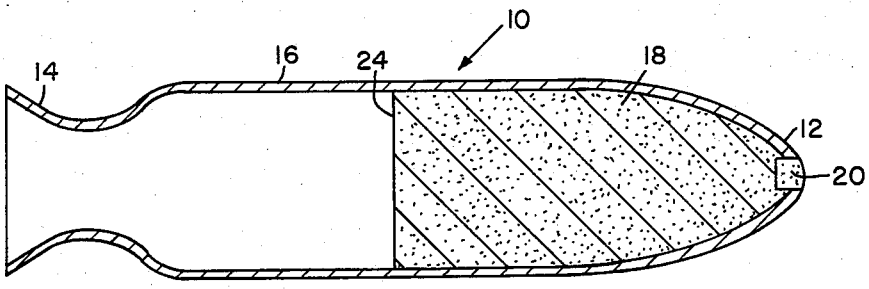
FIG. 2 is a rocket motor containing an explosive propellant grain having an exposed surface for burning after boost phase to provide a sustain thrust phase.

In the design of FIG. 1, the grain is configured to give a high boost acceleration, then a sustaining thrust. As for example, in FIG. 2, the remaining Class 1.1 propellant charge 18 after boost phase depicts a burning surface 24 which progresses at a slower rate due to a change to an end burning grain having less burning surface area as compared with burning surface 22 of FIG. 1. Thus during the sustaining thrust period, (as a result of the continuation of burning of propellant 18), the rocket flies to the target with the burning surface progressing towards the head end. The rocket burns on way to target with some propellant 18 always remaining which will be detonated on impact or prior to impact after activation of detonation fuze 20 by appropriate activation means well known in the art.

Figure 3:
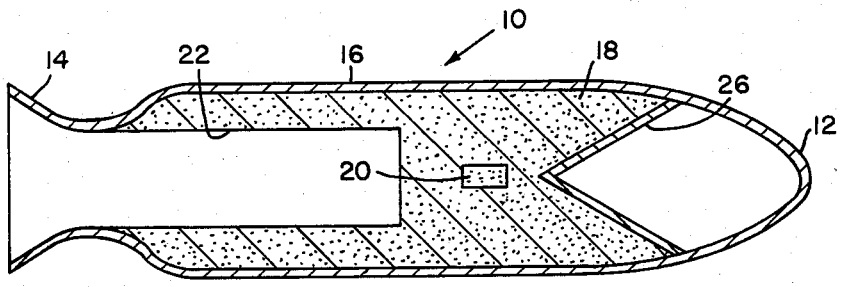
FIG. 3 is a rocket motor containing an explosive propellant grain having an exposed surface for burning, a shape charge at the front end, and a set back base fuze.

The uniqueness of design of FIG. 1 is that there is no separation between the warhead and the motor case. With such a simplicity of design i.e., integral rocket motorwarhead, cost is greatly reduced, the ability to load the rocket in processing and handling is also greatly reduced, and components such as the bulkheads between motor and warhead are no longer needed. Also in this specific design, the motor case 16 may be serrated to give a controlled shrapnel effect. This allows all the motor case to act as controlled warhead shrapnel which is also unique. Another design of this invention is shown in FIG. 3 wherein like numerals are shown for like parts as shown in FIG. 1 but containing a shape charge 26 at the front end. The same similar concept is used in which the propelling charge 18 and the explosive charge 18 are one and the same thing, i.e., Class 1.1 detonatable propellant. In FIG. 3 design, the front of the rocket is left hollow to hold the shape cone 26, and the detonator fuze 20 is located within the propellant charge 18 to insure that the explosive acts in the right direction to produce the right shaping effect.

Class 1.1 detonatable propellants can be selected from formulations to meet requirements for burning rates and explosive needs for the rocket motor structures illustrated and disclosed for use in accordance with this invention.

We claim:

1. A rocket motor comprising a rocket motor case having a forward end which is continuous with said motor case extending from said forward end to an aft end; a nozzle secured to aft end of said motor case; a propellant grain contained within said motor case, said propellant grain being a common burning propellant and an explosive propellant, said propellant grain having an exposed outer surface which burns as an internal or perforated grain propellant during a boost phase to provide boost thrust, said propellant grain surface burning to an end-burning propellant at completion of boost phase and continuing to burn to provide sustaining thrust during sustaining thrust phase, said end-burning propellant burning surface progressing towards said forward end, said propellant grain being of such a predetermined amount to always have an amount of propellant grain remaining when said rocket motor reaches the proximity of a target; and detonator means contained in said rocket motor case and in intimate contact with a portion of said amount of propellant grain remaining and said detonator means being set off in proximity of the target to cause said amount of propellant grain remaining to be exploded and to provide an explosive force to the target.

2. The rocket motor as disclosed in claim 1 wherein said detonation of said propellant grain is achieved prior to impact with a target.

3. The rocket motor as disclosed in claim 1 wherein said detonation of said propellant grain is achieved at impact with a target.

* * * * *